United States Patent

Schlitz et al.

[11] 3,756,664
[45] Sept. 4, 1973

[54] VEHICLE BRAKE SYSTEM

[75] Inventors: Erwin Schlitz, Heusenstamm; Werner Fink, Frankfurt/Main, both of Germany

[73] Assignee: ITT Industries, Inc., New York, N.Y.

[22] Filed: Mar. 28, 1972

[21] Appl. No.: 238,876

Related U.S. Application Data

[63] Continuation-in-part of Ser. No. 49,644, June 25, 1970, abandoned.

[52] U.S. Cl. .................................. 303/21 F, 303/10
[51] Int. Cl. ...................... B60t 8/06, B60t 13/16
[58] Field of Search .................. 303/21 F, 6 A, 6 R, 303/6 C, 6 M, 61, 68, 69; 188/18 R, 18 A, 18 C, 18 T

[56] References Cited
UNITED STATES PATENTS

| 2,941,845 | 6/1960 | Osbourne | 303/21 F |
|---|---|---|---|
| 3,401,982 | 9/1968 | Walker et al | 303/21 F |
| 3,477,765 | 11/1969 | Perrino | 303/21 F |
| 3,514,161 | 5/1970 | Frayer | 303/10 UX |
| 3,532,391 | 10/1970 | Klein | 303/21 F |
| 3,539,227 | 11/1970 | Drutchas et al | 303/21 F |

*Primary Examiner*—Robert S. Ward, Jr.
*Attorney*—C. Cornell Remsen, Philip M. Bolton and Menotti J. Lombardi, Jr. et al.

[57] ABSTRACT

A vehicle brake system including an antiskid device and a pump driven circulation type hydraulic brake booster wherein the booster and the antiskid device are supplied with brake pressure medium from a single pump. The antiskid device includes a deceleration sensor associated with at least one vehicle wheel, an electronic control unit coupled to the sensor to produce an incipient skid signal and a normally open brake pressure medium actuated valve coupled to the single pump and in the brake line coupled between the master cylinder associated with the brake booster and the vehicle wheels for control of the brake pressure applied to these wheels. A normally open solenoid actuated valve is present in the pressure medium line between the single pump and the brake booster. When an incipient skid signal is generated the solenoid actuated valve is closed and the pressure medium from the signal pump closes the brake pressure medium actuated valve to prevent a further increase in braking force on the controlled wheels.

4 Claims, 1 Drawing Figure

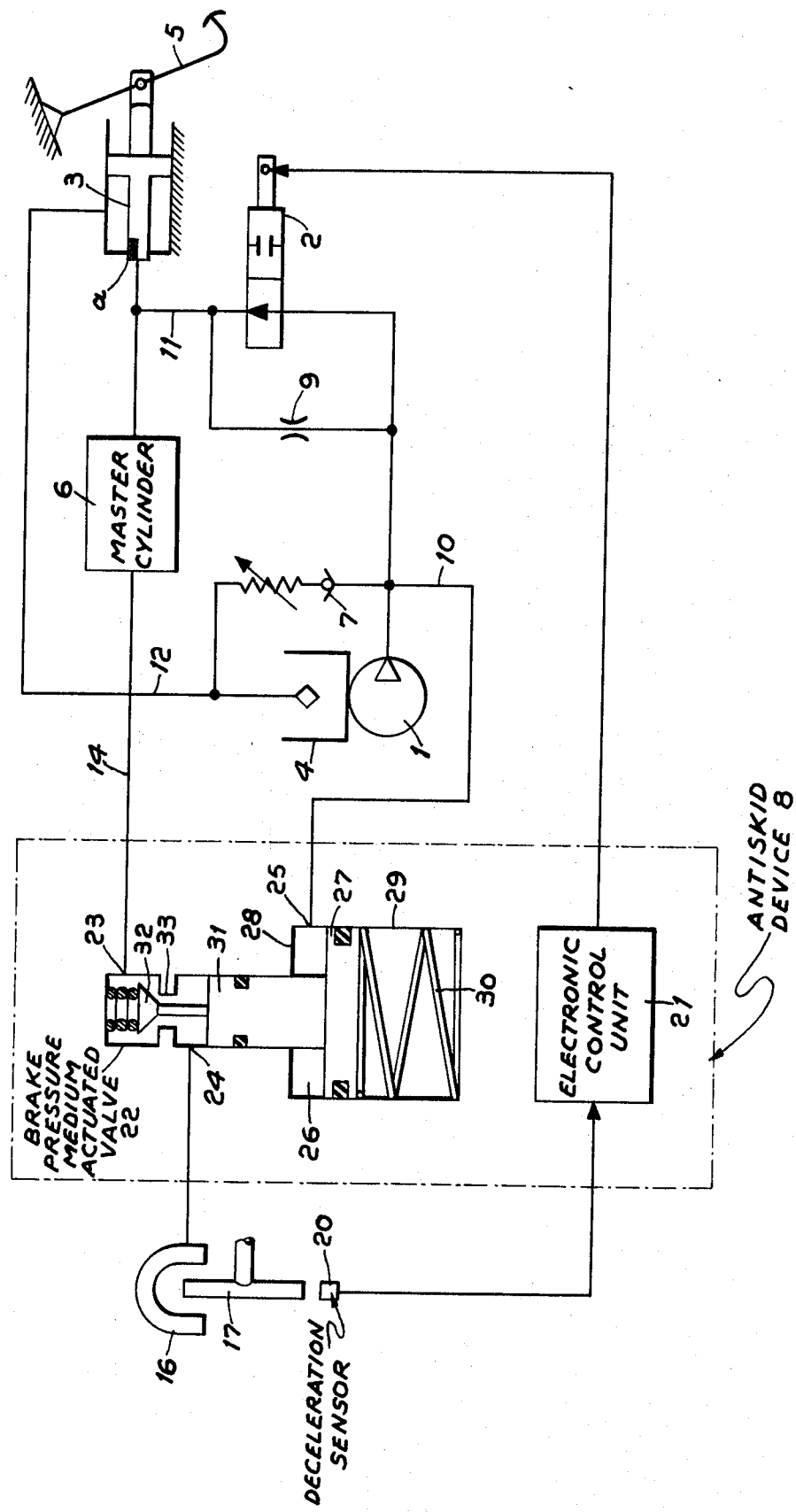

3,756,664

VEHICLE BRAKE SYSTEM

CROSS-REFERENCE TO RELATED APPLICATION

This is a continuation-in-part application of an earlier filed copending application, Ser. No. 49,644, filed June 25, 1970 and now abandoned.

BACKGROUND OF THE INVENTION

This invention relates to vehicle brake systems and more particularly to vehicle brake systems including an antiskid device as well as a pressure medium pump driven circulation type brake booster.

Brake systems for automotive vehicles may be provided with both a hydraulic pump driven circulation type brake booster and an antiskid device. In the prior art this normally required two pressure sources, one pressure source being a pump for supplying pressure medium to a booster chamber behind the master cylinder piston, the pressure in the booster chamber being controlled by a throttle valve movable with the brake actuator and the other source being a source, such as a pressure accumulator, for replacing pressure medium which is removed from the brake lines as the brake line pressure is cycled during antiskid control. This second source is necessary to prevent continued pedal travel and the possible loss of brake pressure, which would occur if the pressure medium had to be replaced from the master cylinder.

The use of two separate pressure sources is expensive and increases the space required for the brake system.

SUMMARY OF THE INVENTION

It is an object of the present invention to eliminate the disadvantages of the two pressure source systems discussed hereinabove and to provide a brake system which accomplishes the same results while being simpler, less costly, and more compact.

This invention achieves these objects by providing a brake system with a single source of pressure medium for both a pump driven circulation type brake booster and an antiskid device. In this system the antiskid device supply line and the line leading to the master cylinder booster chamber are both connected to a single pump whose capacity is not substantially greater than that which would be required for the booster alone since there is a time delay between booster and antiskid operation. A valve located in the pressure medium line between the pump and the brake booster interrupts the circulation flow to the booster at the beginning of the antiskid control cycle. This valve is preferably a solenoid valve, the energizing circuit of which is closed in response to an incipient skid signal produced in the antiskid device, the incipient skid signal initiating the control cycle.

A feature of the present invention is the provision of a brake system for a vehicle comprising: a reservoir for brake pressure medium having an input and an output; a pump for brake pressure medium directly connected to the output of the reservoir; a pump driven circulation type brake pressure medium brake booster, the brake booster being directly connected to the input of the reservoir; a master cylinder directly connected to the brake booster and the pump; at least one vehicle wheel brake to have braking force applied thereto; a solenoid actuated valve directly connected between the pump and the booster to enable direct actuation of the booster by the pump, the solenoid actuated valve having a normally open position and a closed position; a brake pressure medium actuated valve having a pressure medium input controllably connected to a pressure medium output and a pressure medium actuating input directly connected to the pump, the pressure medium input being directly connected to the master cylinder and the pressure medium output being directly connected to the wheel brake; and means directly connected to the solenoid actuated valve and coupled to at least the wheel having the wheel brake to generate a control signal when an incipient skid condition of the wheel is present; the solenoid actuated valve responding to the control signal for switching thereof to the closed position to disconnect the pump from the booster and to enable the pump to actuate the pressure medium actuated valve so as to disconnect the master cylinder from the wheel brake to prevent a further increase in braking force at the wheel brake.

A throttle valve is connected in parallel across the solenoid valve to allow a small increase in the booster pressure during the antiskid control cycle.

A pressure relief valve is connected between the output of the pump and the input of the reservoir to provide a substantially constant pressure source for the antiskid device.

BRIEF DESCRIPTION OF THE DRAWING

The above-mentioned and other features and objects of this invention will become more apparent by reference to the following description taken in conjunction with the accompanying drawing, in which the single FIGURE of the drawing is a schematic representation of a vehicle brake system in accordance with the principles of the present invention.

DESCRIPTION OF THE PREFERRED EMBODIMENT

Referring to the FIGURE of the drawing, in the rest position of the brake system, pump 1 delivers hydraulic fluid or other pressure medium in circulation via solenoid valve 2 through hydraulic brake booster 3 into reservoir 4. Solenoid valve 2 has a normally open position to enable the above mentioned circulation and a closed position. For the actuation of the brake system, the pressure medium circulation in brake booster 3 is throttled by the pressure applied by brake pedal 5. This is shown schematically by means of the slot "a" in brake booster 3. Since the pressure medium flow into reservoir 4 is throttled a servo-pressure, proportional to the capacity of the pump and the pedal pressure applied, is built up in booster 3. By means of this servo-pressure, which becomes effective in master cylinder 6, a brake pressure is built up in pressure medium line 14 leading through antiskid device 8 to brake 16, associated with wheel 17, thus, actuating brake 16. If wheel 17 is decelerated too rapidly as a consequence of excessive braking force, and tends to lock, energy must be provided for antiskid device 8 to prevent a further increase in braking force at brake 16. If the rotational deceleration signal detected by sensor 20 is too strong (an incipient skid condition is present), solenoid valve 2 is switched to its closed position so that the pressure medium delivered by pump 1 flows into supply line 10 of antiskid device 8 is under a pressure greater than the initial pressure in line 10 when valve 2 is in its open position. Line 10 is connected directly to the output of pump 1. The energizing circuit of solenoid valve 2 is closed by an incipient skid signal generated in electronic control unit 21 which is coupled to sensor 20 when an incipient skid condition is detected, the incipient skid signal thereby actuating the antiskid control cycle.

Antiskid device 8 may take many different forms. One illustrative example of device 8 is shown schematically in the drawing as including electronic control unit 21 which produces an output signal for actuating valve 2 when the deceleration of wheel 17, as detected by sensor 20, exceeds a given deceleration threshold value. This solenoid actuating signal at the output of unit 2 which will persist until the reacceleration of wheel 17, as detected by sensor 20, indicates that wheel 17 has reaccelerated to a given reacceleration threshold level at which time the output signal from unit 21 will disappear and, thus, solenoid valve 2 will return to its normal open position. Antiskid device 8 also includes, as illustrated schematically, brake pressure medium actuated valve 22 having a pressure medium input 23 directly connected to pressure medium line 14, a pressure medium output 24 directly connected to brake 16, and a pressure medium actuating input 25 directly connected to pressure medium line 10. Chamber 26 is formed by the space between plunger 27 and the stepped portion 28 of cylinder 29. Plunger 27 is maintained in its normal position by spring 30. Actuating piston 31 is secured to plunger 27 which controls the movement of valve member 32 relative to valve seat 33. In the position illustrated valve 22 is in its normal open position directly connecting master cylinder 6 to brake 16 by means of input 23 and output 24. At the beginning of an antiskid control cycle valve member 32 is seated on valve seat 33, thus, disconnecting input 23 from output 24. Thus, input 23 is controllably connected to output 24.

Prior to an incipient skid condition, namely, during the rest position of the brake system and during the operation of just the booster brake, pump 1 will supply through means of line 10 a given initial pressure to the pressure medium present in chamber 26. This pressure, however, is not sufficient to overcome the bias of spring 30 and, thus, valve member 32 and valve seat 33 will be maintained in their unseated relationship as illustrated. When an incipient skid condition is present, as indicated by the control signal at the output of unit 21, valve 2 is switched to its closed position and the pressure medium under pressure provided by pump 1 will be transmitted through line 10 to chamber 26. The pressure of the pressure medium from pump 1 is sufficient to overcome the bias of spring 30 and will move plunger 27 toward the bottom of cylinder 29. This movement of plunger 27 will move piston 31 and, hence, valve member 32 to engage valve seat 33 thereby disconnecting pressure medium input 23 from pressure medium output 24 and as a result disconnect master cylinder 6 from brake 16 preventing any further increase in braking force at brake 16. In fact, as piston 31 is moved downward by the action of the pressure from pump 1 in chamber 26, the volume between pressure medium output 24 and valve seat 33 will be increased thereby resulting in an increased volume for the brake circuit connected to the brake 16 from output 24 resulting in a decrease in braking force applied to brake 16.

When the control signal from unit 21 disappears (the reacceleration threshold level being equalled or exceeded), valve 2 is switched back to its normal open position thereby deverting the pressure at the output of pump 1 from line 10 back into booster 3 through pressure medium line 11. This results in a pressure reduction in pressure medium line 10 which reduces the pressure in chamber 26 to its initial pressure and the spring 30 will cause plunger 27 to move in a manner to decrease the volume of chamber 26 and return to its initial or rest position resulting in valve member 32 being unseated from valve seat 33. The upward movement of plunger 27 will force the pressure medium back through pressure medium line 10 which, in cooperation with a siphoning effect at the output of pump 1, will return the excess pressure medium from chamber 26 through valve 2 and booster 3 to reservoir 4.

The above described cycle of operation will occur each time control unit 21 produces a control signal indicative of an incipient skid condition.

Due to the fact that the pressure medium in pressure medium line 10 has a certain pressure applied thereto by pump 1 in the rest position of the antiskid device there is no time delay in the pressure medium supply from pump 1 which could disrupt the control cycle when solenoid valve 2 is actuated. A substantially constant pressure in the supply of the antiskid device 8 is insured by an adjustable pressure relief valve 7 connected in parallel to pump 1 and reservoir 4 and oriented for pressure medium flow from the output of pump 1 to the input of reservoir 4. Due to the aforementioned arrangement of pressure-relief valve 7, a predetermined maximum pressure at the output of pump 1 is not exceeded. Throttle valve 9 which is directly connected in parallel across solenoid valve 2 and, thus, connects the output of pump 1 to supply line 11 of brake booster 3 allows the passage of pressure medium only as is required to balance the slight leak caused by slot "a", the latter being reduced by the application of the brakes. Thereby a certain increase of servo-pressure is possible.

While we have described above the principles of our invention in connection with specific apparatus, it is to be clearly understood that this description is made only by way of example and not as a limitation to the scope of our invention as set forth in the objects thereof and in the accompanying claims.

We claim:
1. A brake system for a vehicle comprising:
a reservoir for brake pressure medium having an input and an output;
a pump for brake pressure medium directly connected to the output of said reservoir;
a pump driven circulation type brake pressure medium brake booster, said brake booster being directly connected to the input of said reservoir;
a master cylinder directly connected to said brake booster and said pump;
at least one vehicle wheel brake to have braking force applied thereto;
a solenoid actuated valve directly connected between said pump and said booster to enable direct actuation of said booster by said pump, said solenoid actuated valve having a normal open position and a closed position;
a brake pressure medium actuated valve having a pressure medium input controllably connected to a pressure medium output and a pressure medium actuating input directly connected to said pump, said pressure medium input being directly connected to said master cylinder and said pressure medium output being directly connected to said wheel brake; and means directly connected to said solenoid actuated valve and coupled to at least the wheel having said wheel brake to generate a control signal when an incipient skid condition of said wheel is present;

said solenoid actuated valve responding to said control vehicle for switching thereof to said closed position to disconnect said pump from said booster and to enable said pump to actuate said pressure medium actuated valve so as to disconnect said master cylinder from said wheel brake to prevent a further increase in braking force in said wheel brake.

2. A brake system according to claim 1, further including a throttle valve directly connected in parallel relationship with said solenoid valve.

3. A brake system according to claim 2, further including a pressure relief valve connected in parallel relationship with said pump and said reservoir to limit the pressure at the output of said pump to a given value, said pressure relief valve being oriented to enable brake pressure medium flow from the output of said pump to the input of said reservoir to limit said pressure to said given value.

4. A brake system according to claim 1, further including a pressure relief valve connected in parallel relationship with said pump and said reservoir to limit the pressure at the output of said pump to a given value, said pressure relief valve being oriented to enable brake pressure medium flow from the output of said pump to the input of said reservoir to limit said pressure to said given value.

* * * * *